(12) United States Patent
Shupp et al.

(10) Patent No.: US 6,857,493 B2
(45) Date of Patent: Feb. 22, 2005

(54) AUTOMATIC LOAD POSITIONING FOR A CONVEYOR CART

(75) Inventors: Craig L. Shupp, Smithsburg, MD (US); James A. English, Easton, PA (US); Timothy D. Robertson, Easton, PA (US)

(73) Assignee: Paragon Technologies, Inc., Easton, PA (US)

( * ) Notice: Subject to any disclaimer, the term of this patent is extended or adjusted under 35 U.S.C. 154(b) by 132 days.

(21) Appl. No.: 10/241,193

(22) Filed: Sep. 11, 2002

(65) Prior Publication Data

US 2003/0150657 A1 Aug. 14, 2003

Related U.S. Application Data

(60) Provisional application No. 60/356,550, filed on Feb. 13, 2002.

(51) Int. Cl.[7] .................................................. B60T 7/16
(52) U.S. Cl. ...................... 180/168; 318/587; 414/496; 414/663; 901/1
(58) Field of Search ................................ 180/167–169; 318/581, 587; 701/23–25; 414/495, 663; 187/211, 269; 700/228–230; 29/281.1, 281.4, 281.5, 281.6; 901/1

(56) References Cited

U.S. PATENT DOCUMENTS

| | | | |
|---|---|---|---|
| 3,259,369 A | | 7/1966 | Gridley |
| RE27,914 E | | 2/1974 | King |
| 4,379,497 A | | 4/1983 | Hainsworth et al. |
| 4,464,659 A | | 8/1984 | Bergqvist |
| 4,647,784 A | | 3/1987 | Stephens |
| 4,655,466 A | | 4/1987 | Hanaoka |
| 4,817,750 A | | 4/1989 | Ishida et al. |
| 4,867,277 A | | 9/1989 | Sloan |
| 4,918,607 A | * | 4/1990 | Wible ........................... 701/23 |
| 4,945,622 A | * | 8/1990 | Kaibuki et al. ............. 29/281.1 |
| 4,950,118 A | | 8/1990 | Mueller et al. |
| 5,023,790 A | | 6/1991 | Luke, Jr. |
| 5,077,674 A | * | 12/1991 | Tischler et al. ............. 700/110 |
| 5,090,508 A | * | 2/1992 | Nishikawa .................. 187/211 |
| 5,193,649 A | | 3/1993 | Lee |
| 5,207,333 A | | 5/1993 | Peng |
| 5,220,263 A | | 6/1993 | Onishi et al. |
| 5,267,173 A | | 11/1993 | Tanizawa et al. |
| 5,434,490 A | | 7/1995 | Ishida et al. |
| 5,523,519 A | * | 6/1996 | Weber et al. ................ 588/249 |
| 5,722,513 A | | 3/1998 | Rowan et al. |
| 5,743,705 A | | 4/1998 | Eissfeller |
| 5,829,948 A | * | 11/1998 | Becklund ..................... 414/607 |
| 6,046,698 A | | 4/2000 | Pandey |
| 6,049,745 A | | 4/2000 | Douglas et al. |
| 6,061,887 A | * | 5/2000 | Kawasaki et al. ........ 29/407.01 |
| 6,112,858 A | | 9/2000 | Arnst |
| 6,446,743 B2 | * | 9/2002 | Suzuki ........................ 180/168 |
| 6,721,627 B2 | * | 4/2004 | Udou et al. .................. 700/228 |

FOREIGN PATENT DOCUMENTS

| | | | |
|---|---|---|---|
| JP | 57-194861 | * | 11/1982 |
| JP | 2001-347943 | * | 12/2001 |

* cited by examiner

Primary Examiner—Bryan Fischmann
(74) Attorney, Agent, or Firm—Drinker Biddle & Reath LLP (57) ABSTRACT

A system for adjusting the position of a load supported on a conveyor cart includes a driven lift mechanism for controlling height and a turntable for controlling rotational orientation. The cart may, alternately or in addition to the above mechanisms, include a gimbal mechanism for rotational adjustment about multiple axes. A processor on the cart provides actuation and control of the mechanisms. An ID card reader on the cart senses ID tags for determining when the cart is adjacent particular locations. Data representing desired load position at the locations is stored either in a memory device or by the ID tag for relay to the processor on the cart via the ID tag reader. A system level controller provides a centralized storage location for desired load position data for communication to a plurality of conveyor carts through a communication link that includes radio frequency modems.

26 Claims, 6 Drawing Sheets

AUTOMATIC LOAD POSITIONING FOR A CONVEYOR CART

RELATED APPLICATION

This application is related to and claims priority from provisional application Ser. No. 60/356,550, filed Feb. 13, 2002, which is incorporated herein by reference in its entirety.

FIELD OF THE INVENTION

The present invention relates to conveyor systems and more particularly to a system for controlling the height and rotational/angular orientation of a load carried by a conveyor cart.

BACKGROUND OF THE INVENTION

In assembly line manufacture, workpieces are conveyed along a path between multiple stations where operators perform sequential tasks on the workpieces. The workpieces are commonly supported on wheeled carts conveyed along the path by a drive system to which the cart is secured.

It is desirable to provide adjustability in the height at which the workpieces are supported by the carts. Adjustment in the height of a supported workpiece facilitates the performance of differing tasks on the workpiece. Such adjustment also facilitates the performance of a task by differing operators by providing for adjustments based on operator height or individual preferences, for example. It is known to include motor driven scissors-lift mechanisms for adjustment in the height of a load supporting platform. In U.S. Pat. No. 6,112,858 to Arnst (incorporated herein by reference in its entirety), actuation and control of the scissors-lift mechanism is limited to simple on-off control provided by foot-peddles carried by the base portion of the cart.

It is also desirable to provide for adjustability in the rotational orientation of a cart supported workpiece. Such adjustment in the rotational orientation facilitates the performance of tasks on opposite sides of the workpiece or for providing additional access to the workpiece, for example. In Arnst '858, a pivotably supported turntable provides for adjustment of the rotational orientation of a supported load. The adjustment in the orientation of the workpiece, however, is limited to rotational adjustment about a vertical axis (i.e., about a single axis). Also, the turntable disclosed in Arnst '858 is not motor driven. Adjustment of the rotational orientation of a supported load in Arnst, therefore, requires that the workpiece be rotated manually by an operator at a particular station on the assembly line.

SUMMARY OF THE INVENTION

According to the present invention, there is provided a system for adjusting the position of a load supported on a platform of a conveyor cart. The system includes a driven lift mechanism connected to the platform for adjusting height. The lift mechanism is most preferably a hydraulically or pneumatically driven scissors mechanism.

The system also preferably includes a driven mechanism, most preferably a turntable, for adjusting rotational orientation. Alternatively, the system could include a gimbal mechanism or multi-axis positioning system for rotational and angular adjustment about multiple axes.

The system also includes an on-board controller mounted on the cart for controlling the operation of the load position adjusting mechanisms.

According to one embodiment of the invention, the system includes sensing means carried by the cart for determining proximity of the cart to station locations along a path of the cart. The means for sensing most preferably includes an RF tag reader mounted on the cart for sensing programmable RF tags mounted adjacent to station locations. Desired load position information may be stored on the RF tag for transmission to the RF tag reader. Alternately, the cart processor may include a memory device for storage of load position data for each of the locations.

According to another embodiment of the invention, the system includes a system-level controller for central storage of load position data for each station location A communication system provides for transmission of the position data from the system level controller to the cart processors. Preferably, the communication system includes a first radio frequency modem or transmission device connected to the system level controller and a second radio frequency modem or transmission device connected to the processor of each cart

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

DETAILED DESCRIPTION OF THE INVENTION

Referring to the drawings, wherein like reference numerals illustrate corresponding or similar elements throughout the several views, a system for controlling the height and the angular orientation of a load carried by a conveyor cart is disclosed. Control of load position may be desirable on an assembly line, for example, for raising and lowering of an assembly workpiece for ergonomic reasons or for angular adjustment of the assembly workpiece to allow enhanced operator access or to provide interface with other tools or manipulators.

Figure 1:
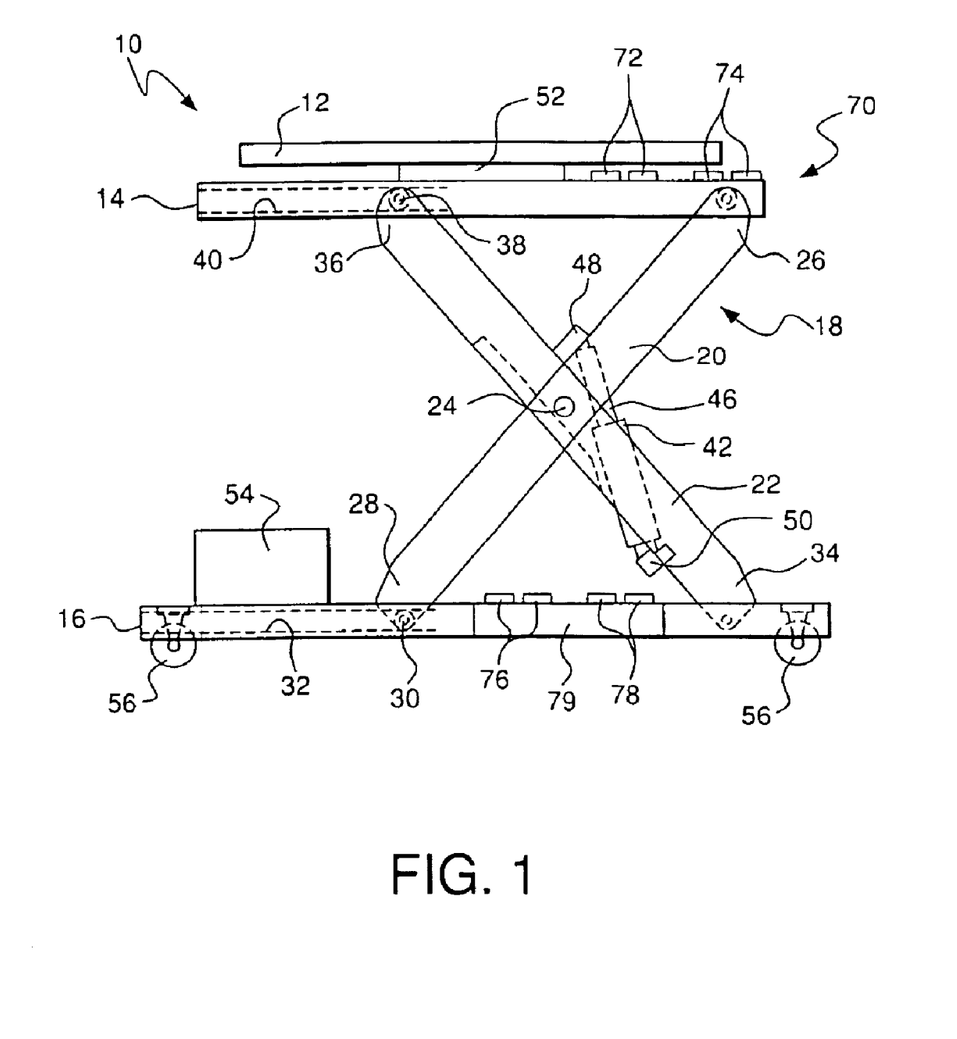
FIG. 1 is a side view of a conveyor cart according to the present invention.

Referring to the drawings where like numerals refer to like elements, there is shown in FIG. 1 a conveyor cart 10 having a load support member 12 for mounting of an assembly line workpiece, for example. The conveyor cart 10 includes a platform 14 and a base 16. The cart 10 also includes a scissors lift mechanism 18 for providing adjustment of the height of the platform 14. The scissors lift mechanism 18 includes first and second arms 20, 22. More preferably, there are two sets of arms 20, 22 located on opposite sides of the cart 10. In the side view of FIG. 1, only one set of the arms 20, 22 is visible, it to be understood that the arms at the opposite side would appear as a mirror image were the cart to be viewed from that side.

The first arms 20 are pivotably connected to the second arms 22 preferably at a central location (indicated by the numeral 24 in FIG. 1). An end 26 of each of the first arms 20 is pivotably connected to the platform 14 preferably adjacent an end of the platform. An opposite end 28 is secured to a roller or slide 30 received in a track 32 carried by base 16 such that end 28 is slidable with respect to the base 16. An end 34 of each of the second arms 22 is pivotably connected to the base 16. An opposite end 36 is secured to a roller or slide 38 received in a track 40 carried by platform 14 such that end 36 is slidable with respect to the platform 14. The slidable connection of the first and second arms 20, 22, to the base 16 and the platform 14 allows for extension and contraction of the arms and a corresponding change in the height of the platform 14. Alternately, the upper or lower ends of both arms 20, 22 can be pinned to the platform 14 and base 16, respectively. However, in this alternate embodiment, the two arms 20, 22 cannot be pinned to one another (such as at 24) but must be free to move relative to one another.

The scissors lift mechanism 18 includes a motor drive unit 42, preferably of an electro-hydraulic type, having a base portion 44 and a slidably driven rod portion 46 for powered extension and contraction of the first and second arms 20, 22. The lift mechanism 18 includes a crossbeam 48 extending between, and secured at its ends to, the first arms 20. Similarly, a crossbeam 50 is secured at its ends to the second arms 22. The base portion 44 and rod portion 46 of the motor drive unit 42 are pivotably connected to crossbeams 50, 48, respectively such that extension of the rod portion 46 results in extension of the scissors arms 20, 22.

The conveyor cart 10 also includes a motor driven turntable 52 supported by the platform 14 of cart 10. The turntable 52 provides for adjustment in the rotational orientation of a supported load about a vertical axis. A battery 54 carried by the base 16 of the cart 10 provides an on-board power source for the motor driven turntable 52 and for the scissors lift mechanism 18.

The cart 10 includes wheels 56 connected to the base 16 to provide for translation of the cart 10. The cart 10 may be connectable to a chain drive (not shown) of an assembly line conveyor system in the manner well known in the art.

Figure 2:
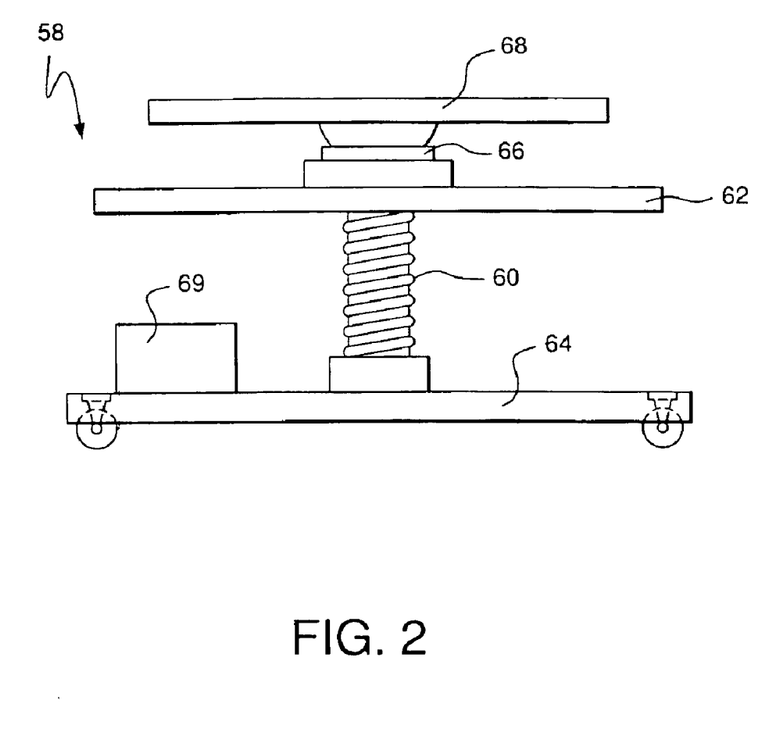
FIG. 2 is a side view of an alternate conveyor cart conveyor according to the present invention.

The present invention is not limited to height adjustment using a scissors lift mechanism. Referring to FIG. 2, a cart 58 is shown that includes a jack screw mechanism 60 connecting a platform 62 to a base 64 for adjustment in the height of the platform 62. It is also contemplated that a pneumatic lift can be used to provide for adjustable height of a cart platform. Pneumatic lifts and jack screw mechanisms are well known and, therefore, no further discussion is needed.

The present invention is also not limited to the use of a turntable for providing rotational adjustment of a supported load. As shown in FIG. 2, the cart 58 may include a gimbal mechanism 66 or a universal joint (not shown) for providing rotational and angular adjustment of a load support member 68. The gimbal mechanism 66 provides for adjustment in the rotational orientation of a supported load about an axis perpendicular to the load support member 68 (a vertical axis in FIG. 2) in a similar manner as the turntable 52 of FIG. 1. The gimbal mechanism 66, however, provides for a much larger range of motion than the turntable 52 by providing for adjustment in an angular orientation of the supported load about any axis lying in the plane of the load support member 68 (i.e., about any horizontal axis in FIG. 2). A battery 69 provides the power source for operating the jack screw mechanism 60 and the gimbal mechanism 66. Gimbal mechanisms and universal joints are well known in the art and, thus, no further discussion is necessary.

A cart according to the present invention could include other mechanisms, such as a multi-axis positioning system, for providing adjustment in the rotational/angular orientation of a load supported by the cart. A multi-axis positioning system provides for adjustment in the angular orientation of a supported load about a plurality of axes.

Referring again to FIG. 1, the cart 10 includes a control system 70 for providing operational control of the adjustable features of cart 10. The control system 70 may include hand-operated switches 72, 74 (shown schematically in FIG. 1) mounted on the platform 14. The switches 72, 74 permit operator control over the lift mechanism 18 and the motor driven turntable 52. The cart 10 may also include foot-operated switches 76, 78 carried on an extension 79 of base 16. The foot-operated switches 76, 78 provide an alternate means of controlling the lift mechanism 18 and the motor driven turntable 52. The cart 10 preferably includes end-of-travel limit switches and/or hard stops to prevent over-travel or over-rotation by the operator.

As an alternative to on-board operator controls, the control system could include operator controls mounted adjacent to the stations in the facility. The operator's inputs to the station mounted controls could be conveyed to the cart through various means, including RF or IR signals, hard-wired plug-ins, etc.

Figure 3:
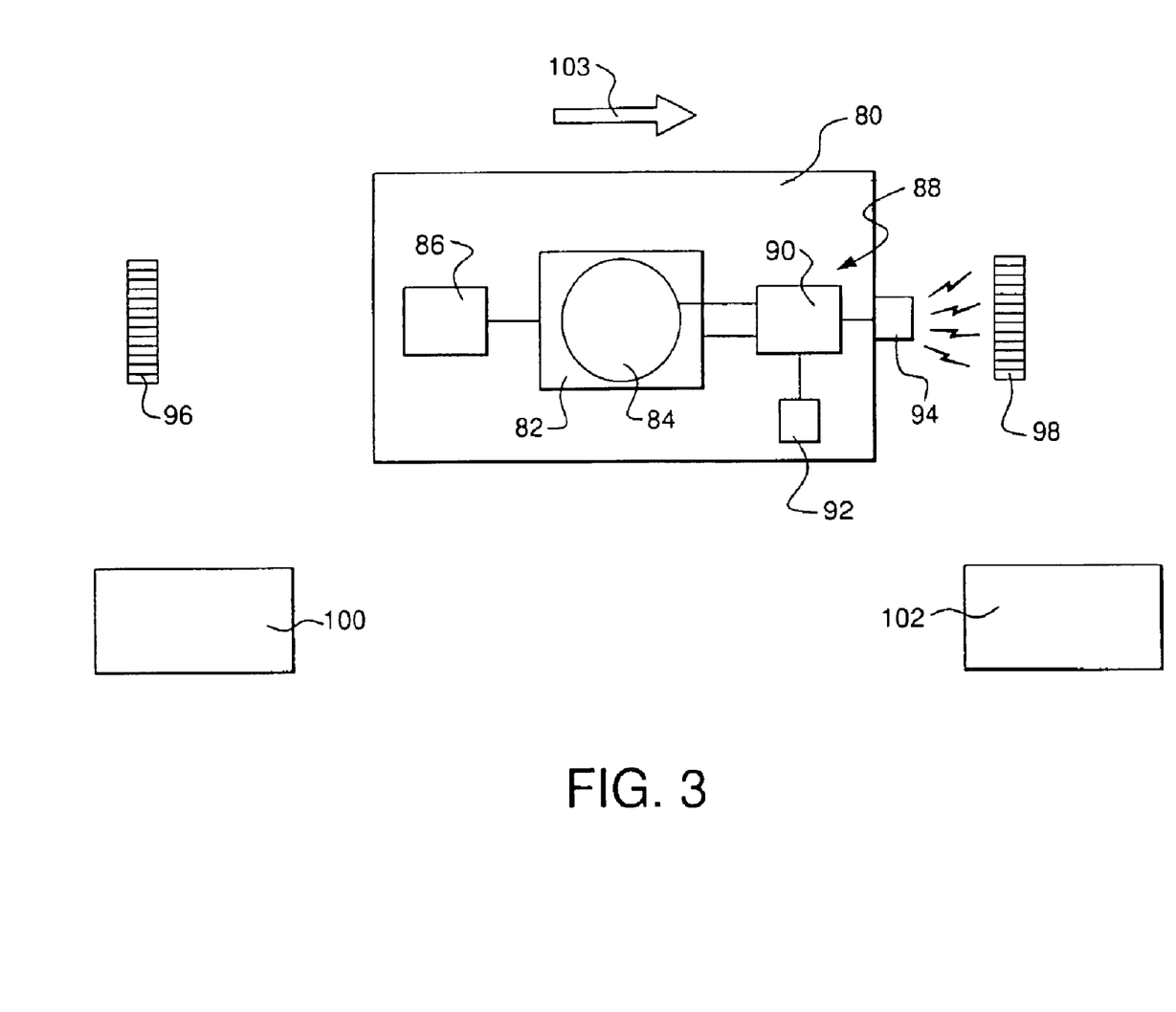
FIGS. 3–5 are schematic illustrations of load position control systems according to the present invention.

Referring to FIG. 3 there is shown a cart 80 having a vertical lift mechanism 82 and turntable 84 for adjustment of a supported load. A battery 86 provides power for the lift mechanism 82 and the turntable 84. The cart 80 includes a control system 88 having a control processor 90 providing on-board intelligence for controlling the operation of the lift mechanism 82 and the turntable 84. The control system 88 may further include an operator interface 92 having a keypad or input device connected to the processor 90. The interface 92 provides for selection of a particular position for a supported load for actuation and control of the lift mechanism 82 and turntable 84 by the processor 90. The control system 88 could be configured for entry into the keypad of numerical values representing load position (i.e., height in inches and rotation in degrees) for actuation and control by the processor 90.

Alternatively, information regarding multiple selectable positions for the load could be stored in memory by the processor 90 for selection by an operator from among multiple preset positions, using buttons numbered 1 through 5, for example. As an alternative to selection of presets using a numbered keypad, the control system 88 could include a multi-position switch connected to the processor 90 for selection among multiple positions stored in the processor. Control over the lift mechanism 82 and turntable 84 by the on-board processor 90, rather than by manual operator control, facilitates achievement of final height and rotational position quickly and smoothly while avoiding mechanical interferences.

The cart 80 of FIG. 3 could also include hand and/or foot switches to permit the operator to override the on-board control by processor 90. In a similar manner to cart 10 of FIG. 1, the cart 80 preferably includes end-of-travel limit switches and/or hard stops to prevent over-travel or over-rotation. The manual control allows the operator to make major or minor adjustments in the height and/or orientation of the platform that may have previously been set by the automated adjustment. Hence, if the operator needs to turn the workpiece slightly to increase access to a particular location, he can manually command an adjustment in the work platform position.

The control system 88 for cart 80 of FIG. 3 also provides for sensing of the location of the cart 80, within a facility for example, to provide situational awareness (e.g., location of the cart 80 with respect to a particular workstation). In the manner to be described, the ability to sense the location of the cart 80 provides for automatic control over platform height and rotational orientation by an on-board controller without the need for operator intervention using the operator interface 92 for example.

The control system 88 of cart 80 includes an ID tag reader 94 mounted on the cart 80. The ID tag reader 94 is capable of sensing and receiving information from an ID tag, such as tags 96, 98 located adjacent to stations 100, 102 for example. The ID tags may be can be selected from a variety of identification devices, including bar codes or magnetic strips. Although various forms of communication would be suitable for use in the control system 88, it is preferable that radio frequency be used for relaying information from the ID tags 96, 98 to the ID tag reader 94 mounted on the cart 80. The cart 80 is directed along a particular pathway within the facility, for example, to the right in FIG. 3 between stations 100, 102 as indicated by arrow 103. The direction of the cart 80 could be provided by connection of the cart to the chain drive (e.g., tow line) of an assembly line (not shown).

Alternatively, the cart 80 could include a separate on-board drive system and could be guided through the facility on a rail or track system, or by an imbedded wire in an inductive guidance system known in the art. When the cart 80 approaches one of the stations, such as station 102 as shown in FIG. 3, the ID tag (tag 98 in FIG. 3), is sensed by the ID tag reader 94. Information regarding the desired load position for the associated station (station 102 in FIG. 3), is received by the ID tag reader 94 from the ID tag 98. The desired position information received by the ID tag reader 94 is then relayed to the on-board processor 90 for actuation and control of the lift mechanism 82 and turntable 84 to re-position the load for the station for the associated station 102.

As an alternative to locating ID tags adjacent the station locations, a removable ID card could be used. The ID card could be preprogrammed with either load position information or a station identifier. The operator would bring the ID card to the station and mount it in a particular location which can be sensed by the ID reader on the cart as the cart approaches the station. Alternatively, an operator could present the ID card to the ID reader as the cart approaches the operator's station. The ID cards may either be specific to an operator or generic to the station. If they are specific to an operator, the ID card may include information about the operator to provide operator specific adjustment. For example, the ID card may include the operator's height and/or whether she is right-handed or left-handed.

Figure 4:
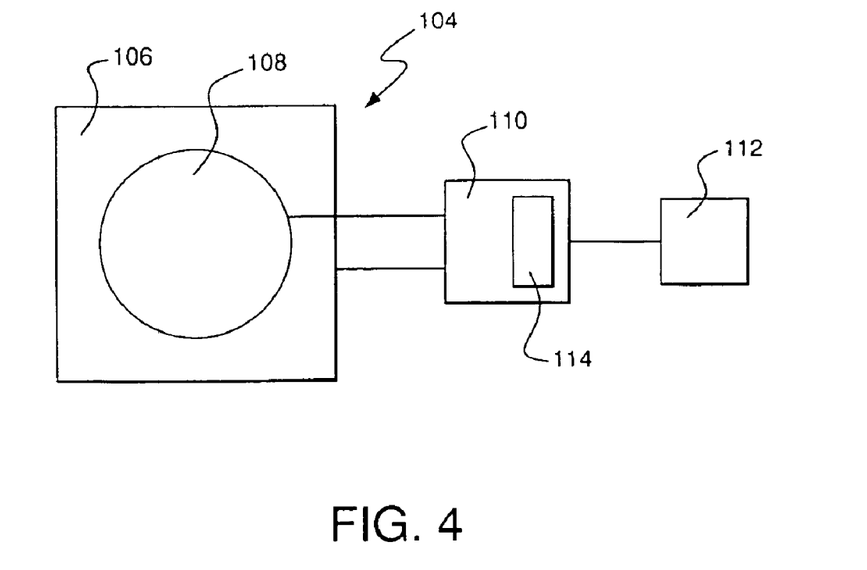

Referring to FIG. 4, there is shown schematically a control system 104 according to the present invention for controlling the operation of a lift mechanism 106 and turntable 108 carried by a cart (not shown). The control system 104 includes a processor 110 connected to the lift mechanism 106 and to the turntable 108. The control system 104 also includes a tag reader 112 for sensing an ID tag adjacent a workstation in a facility, for example. The ID tag reader 112 preferably uses radio frequency signals in a similar fashion to ID tag reader 94 of FIG. 3.

The processor 110 of control system 104 includes a memory device 114. The memory device 114 of processor 110 provides for on-board storage of position information for a plurality of stations within a facility for example. In this embodiment, the ID tags at the various stations do not have position information programmed into them as was the case for the ID tags 96, 98 of FIG. 3. Instead, the ID tags need only provide a signal that uniquely identifies a given station such that the processor can distinguish a particular station from the other stations within the facility. This identifying signal is relayed from the ID tag reader 112 to the processor 110. Upon receipt of an identifying signal, the processor 110 accesses the on-board memory storage device 114 to retrieve the position information stored in the memory device 114 for the identified station. Position data for the stations could be added or updated in the memory device 114 by various methods, including telecommunication, electrical interface, etc. For example, during recharging of the on-board batteries, a download of position data can be provided into the memory.

Figure 5:
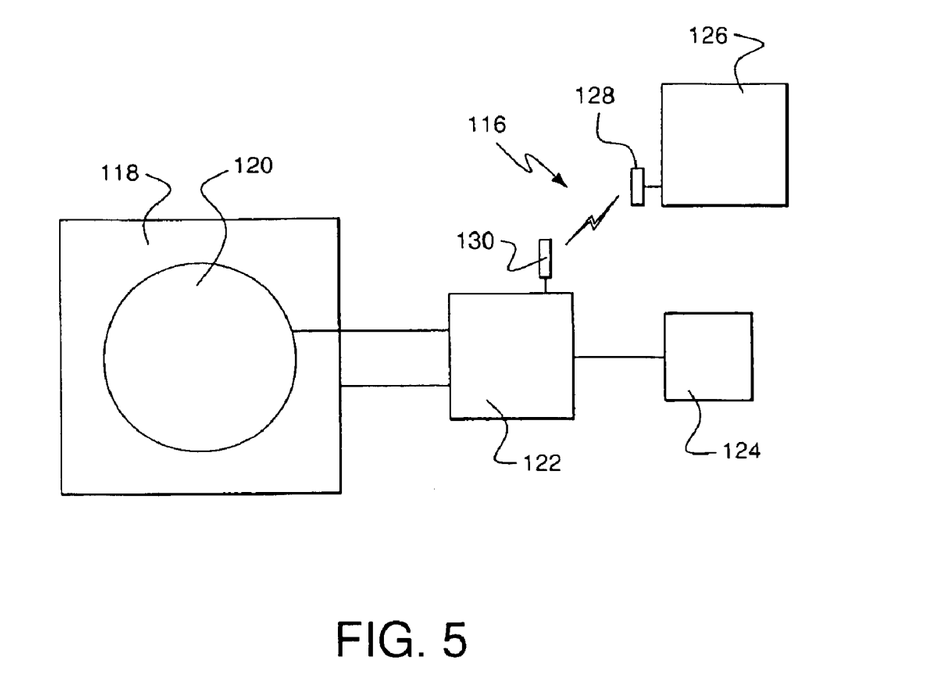

Referring to FIG. 5, there is shown schematically another embodiment of a control system 116 according to the present invention for controlling the operation of a lift mechanism 118 and turntable 120 carried by a cart (not shown). The control system 116 includes a processor 122 connected to the lift mechanism 118 and to the turntable 120. The control system 116 further includes a tag reader 124 similar to the ID tag reader 112 of FIG. 4. In this embodiment, the position information associated with the various stations is not stored in memory with the control processor 122. Instead, the control system 116 includes a system level controller 126 for providing centralized storage of the position information associated with all of the stations within a facility, for example.

The system level controller 126 is connected to a radio frequency modem or other transmission device 128 that provides a communication link with each of the individual carts within a facility. Each of the separate carts includes a radio frequency modem or other transmission device 130 connected to the processor 122 for receiving information from (and transmitting information to) the system level controller 126. In this embodiment, the system level controller 126 serves as a communications hub in a communication network.

The central location of the system-level controller 126 in the communication network provides for system-level control of load positioning for each of the carts in the following manner. Each of the ID tags for the stations is programmed to transmit only a location identifier (e.g., a station number) in a similar manner to the ID tags in the control system 104 of FIG. 4. When the ID tag reader 124 senses an ID tag, the reader 124 transmits the station identifier to the on-board processor 122. The processor 122 then broadcasts the station identifier to the system-level controller 126 via the communication link provided by RF modems 128, 130. Load position information for the station sensed by the ID tag reader 124 is retrieved from storage by the system-level controller 126 and transmitted back to the on-board processor 122 via modems 128, 130. The processor 122 uses the received information to actuate and control the lift mechanism 118 and turntable 120 in a similar manner to that described previously.

The height and rotational/angular orientation information for each station location within the facility is entered into storage of the system level controller 126 of control system 116 using an operator interface. The control system 116 may be further adapted to interface with a product tracking management system to provide an additional level of control over load position by the control system 116. In this manner, multiple load positions associated with a particular station location may be stored for selection depending on the particular load being conveyed. This may be useful, for example, in applications involving products that are custom assembled according to a buyer's specifications. Depending on the work options available at each station location, the product may need to be presented to a station's operator differently (or stations may be skipped entirely). For example, a station may require one side of the product to be worked on first, then upon completion, the table rotated so that another side can be worked on. The operator may enter a "done" command which is transmitted to the system level computer signaling a change in the position to the next stored value. This additional level of control permits dynamic changes to the load position instructions so that a cart's instruction can be varied according to the specifics of the load carried as well as the requirements of each station. It should be readily apparent that this last feature of the invention is also applicable to the prior embodiment where the position data is stored on the cart.

It is also contemplated that a "learning" function can be incorporated into the embodiment shown in FIGS. 4 and 5. In this optional feature of the invention, the operator at a particular station can input specific position information (for example, in addition to or as a modification of preprogrammed position data). The operator can then activate a "learn" function which causes the new position information to be stored (either locally or, more preferably, at the central controller.) As a result, subsequent carts transferred to the station will automatically adjust to the new position data.

Figure 7:
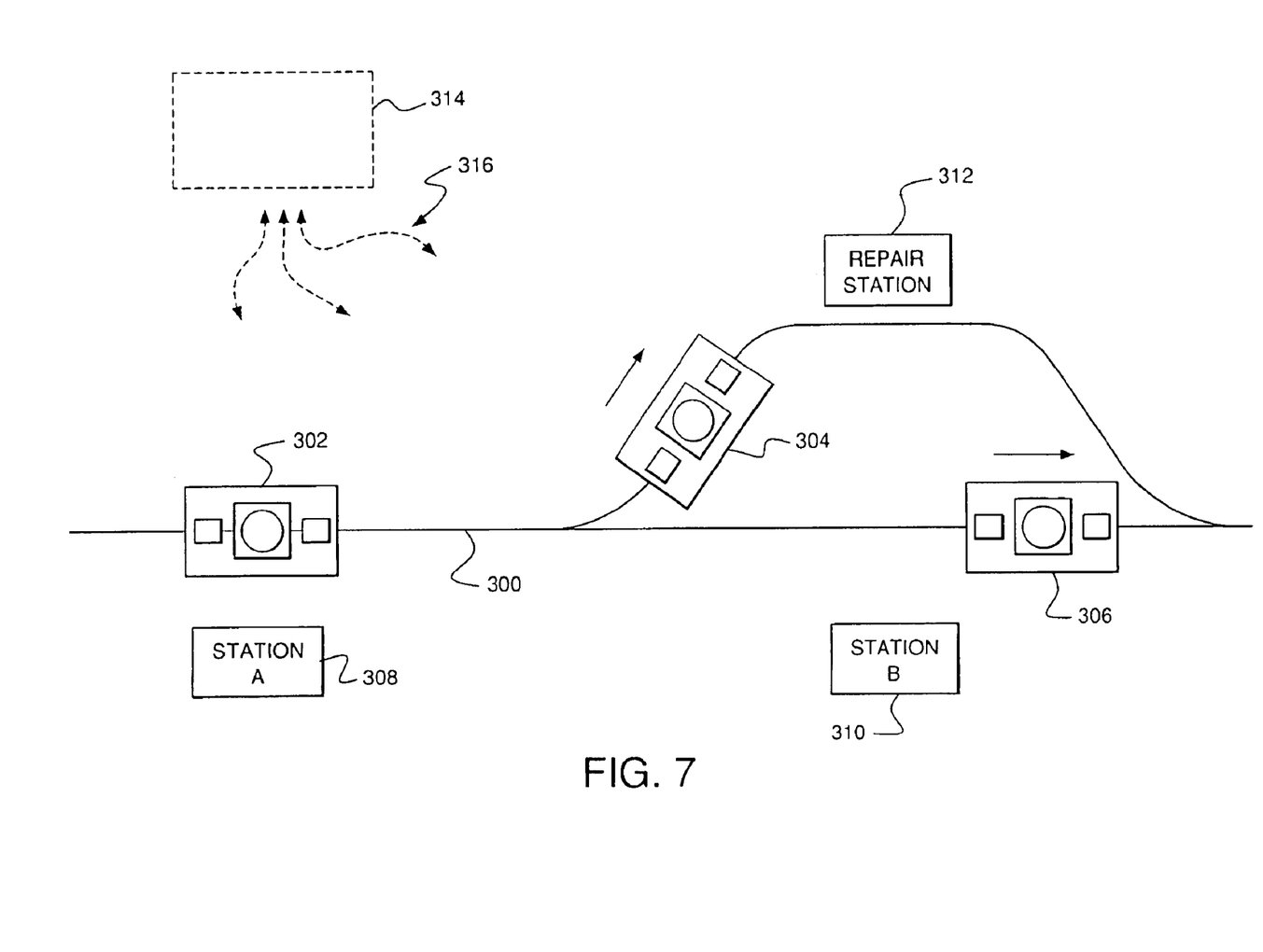
FIG. 7 schematically illustrates a portion of an assembly line with multiple carts according to the present invention.

The inclusion of the system level controller 126 in the control system 116 also provides the additional benefit of allowing an operator at a station to identify a problem with a particular workpiece. The operator could key in a command, for example, for transmission to the system level controller to inform the controller of a problem with the workpiece at the operator's station. The system-level controller could then track the workpiece for subsequent attention. Alternately, the conveyor system could be configured to provide for redirection of the cart, to a repair station off the main assembly line for example, by the system level controller. Referring to FIG. 7, this optional feature of the invention is shown. In the figure, a plurality of carts 302, 304, 306 are shown moving along a tow line 300 between stations 308, 310. Upon detecting a problem with the work product, the cart 312 caring the defective product may be directed to a repair station 312 for further attention. The control for directing the cart 312 to the repair station 312 can be providing by the on-board computer or the central processor 314 via transmitted signals 316. This embodiment of the invention permits a cart to be removed from the assembly line, thus minimizing downtime of the assembly line.

In a similar fashion as the control system 88 of FIG. 3, the control systems 104, 116 of FIGS. 4 and 5 may include hand and/or foot switches having end-of-travel limit switches and/or hard stops. The inclusion of the switches allows an operator to override the automatic control by the on-board control processor or provide additional adjustment. The control systems 104, 116 may also include an operator interface allowing the operator to key in additional changes. For example, if the operator needs to work on a supported load in two different load positions at his station (e.g., opposite sides of the workpiece), the operator interface can provide for adjustment among multiple positions at the same station location. When an operator has completed a first task with the supported load in a first position, the operator can use the operator interface to select a second position for the load. The control systems 104, 116 then can automatically lift and/or rotate the load to the selected second position.

In each of the automatic control systems shown in FIGS. 3–5, the cart location is determined based on a communication link between an on-board ID tag reader and an ID tag located adjacent a station. The present invention, however, is not limited to determination of cart location in this manner. Information regarding cart location can be provided, for example, by mounting a GPS (global positioning system) receiver on each of the carts. The system-level controller 126 of control system 116 of FIG. 5, could monitor cart location information determined in this manner, using the RF modems 128, 130. When the system-level controller 126 senses that a cart is approaching one of the station locations within the facility, the system-level controller 126 would transmit the stored load position information to the on-board processor 122 for that cart controller in a similar manner as that previously described.

A GPS monitoring system could also be incorporated into the control system 104 of FIG. 4 where load positioning data is stored on the carts. The processor 110 of control system 104 would determine the location of the cart within the facility and retrieve the necessary positioning data from the on-board memory device 114.

Figure 6:
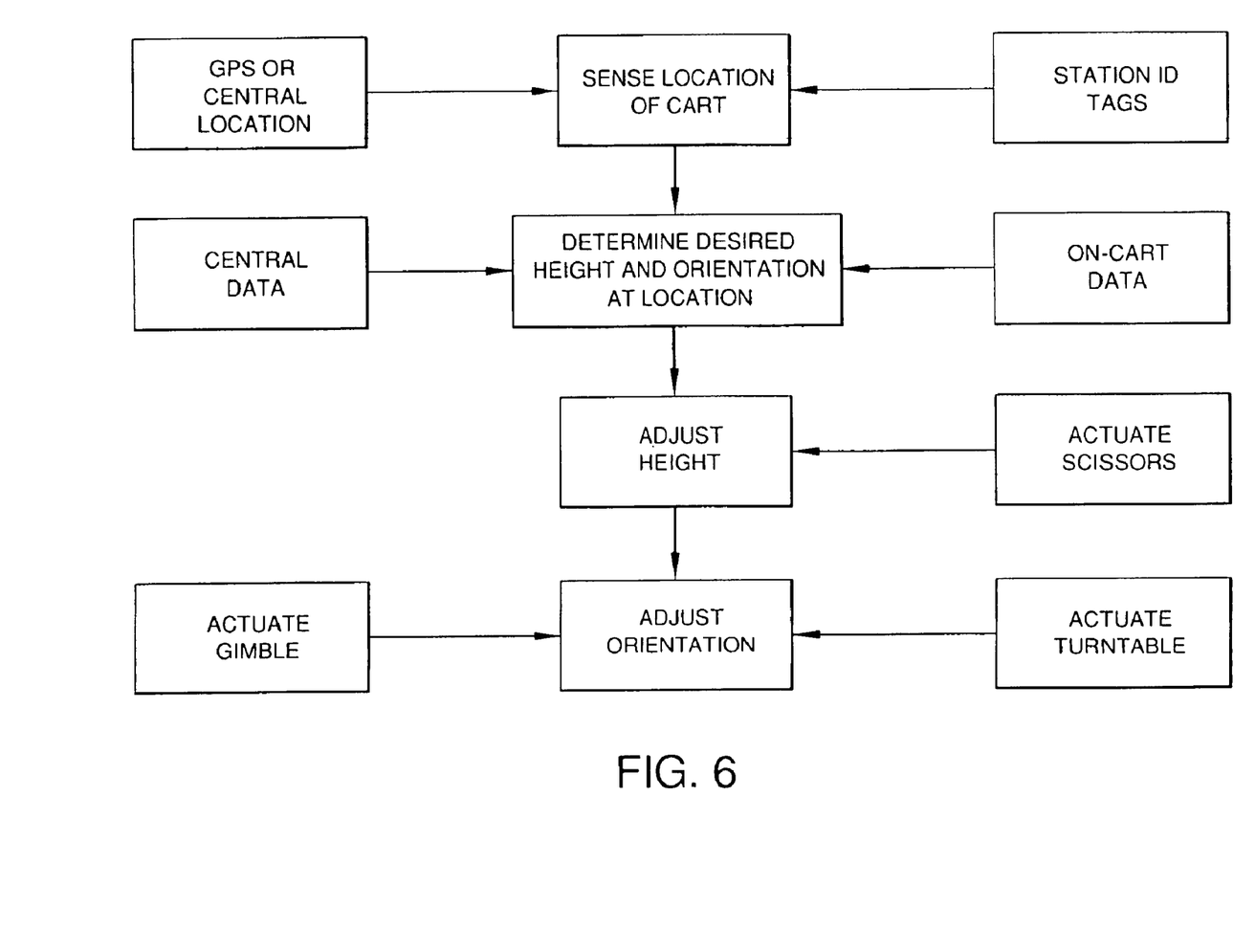
FIG. 6 schematically illustrates a method of controlling load position according to the present invention.

Referring to FIG. 6, a method according to the present invention for controlling the position of a supported load on a conveyor cart is shown schematically. The position of the cart within the facility is sensed by the control system, either by use of station ID tags as shown in FIG. 3 or by some other means such as a GPS monitoring system. When the system senses that the cart is located in a particular location within the facility, such as adjacent or approaching one of the stations, the system determines height and rotational/angular orientation position, or positions, that have been preselected for that location.

The system determines the preselected position information either by accessing data stored in memory on-board the cart for use by the control processor of the cart. Alternately, the system determines preselected position information by accessing data stored in memory associated with a central system-level controller using the communication link shown in FIG. 5, for example. The position information is relayed to the on-board control processor for adjustment of height by actuation and control of a scissors lift mechanism (FIG. 1), a jack screw mechanism (FIG. 2) or some other type of lift mechanism. Prior to, concurrent with or subsequent to the height adjustment, the processor uses the determined position information to actuate and control a turntable (FIG. 1) to adjust rotational orientation (if required) and/or actuate and control a gimbal mechanism (FIG. 2) to adjust rotational/angular orientation of the load.

While the positioning of the workpiece has been described above as occurring adjacent a work station, it is also contemplated, and in certain situations may be more preferable, that the load position adjustment occur at a distance from the stations. For example, if the workpiece is very large and it needs to be rotated before work can be performed at the next station, obstacles at the station may prevent its rotation. Also, rotating the workpiece near workers can be dangerous. In such situations, an ID Tag can be located in between stations allowing the cart to reposition the workpiece before it reaches the next station. Alternately, repositioning can begin immediately upon the cart sensing that it is leaving a station.

It is also contemplated that an RF communication signal from a central location can be used to update position data stored onboard the cart.

Although the control system of the present invention has been described in conjunction with conveyor carts of a towline type conveyor system, the present invention is not so limited. It is contemplated, for example, that each of the carts could include an independent drive system and that the cart could be preprogrammed to follow a particular assembly line path. Use of an on-board GPS system would facilitate the movement of the cart between stations.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather should be construed in breadth and scope in accordance with the recitation of the appended claims.

What is claimed is:

1. A conveyor system comprising:
    at least one conveyor cart having a platform for supporting a load and a base, the cart adapted to be conveyed along a path within a facility;
    at least one driven adjustment mechanism for adjusting the position of the supported load with respect to the base;
    a control processor located on-board the cart for actuating and controlling the at least one position adjusting mechanism;
    means for determining proximity of the cart to at least one location within the facility; and
    means for storing data representing desired load position adjustment for each of the locations within the facility, the controller actuating and controlling the adjustment mechanism according to the position data stored for a particular location when proximity of the cart to the location is determined.

2. The conveyor system according to claim 1, wherein the means for determining proximity comprises an ID tag reader carried on-board the cart, the ID tag reader capable of sensing an ID tag associated with each of the locations within the facility.

3. The conveyor system according to claim 2, wherein each of the ID tags is mounted adjacent one of the locations.

4. The conveyor system according to claim 2, wherein each of the ID tags is programmable and wherein the data representing desired position adjustment for the associated location is programmed into the ID tag for relay to the on-board processor via the ID tag reader when the ID tag is sensed by the ID tag reader.

5. The conveyor system according to claim 2, wherein the on-board processor includes a memory storage device the storage device containing desired position adjustment data for each of the locations, and wherein the processor is adapted to retrieve specific position adjustment data from the storage device which data is associated with the specific ID tag read by the ID tag reader.

6. The conveyor system according to claim 1, further comprising a system-level controller, the desired position adjustment data for each of the locations being stored in the system level controller, the conveyor system further comprising a communication means linking the system-level controller and each of the carts for transmission of the desired position adjustment data from the system-level controller to the on-board processor for the cart.

7. The conveyor system according to claim 6, wherein the communication means comprises a first radio frequency modem connected to the system level controller and a second radio frequency modem connected to the on-board processor for each of the carts.

8. The conveyor system according to claim 1, wherein the at least one driven mechanism includes a lift mechanism for adjustment of the height of the load-supporting platform.

9. The conveyor system according to claim 1, wherein the at least one driven mechanism includes an adjustment mechanism supported by the platform for adjustment of the rotational orientation of a supported load.

10. The conveyor system according to claim 9, wherein the at least one driven mechanism is capable of adjusting the orientation of a supported load with respect to a plurality of axes.

11. The conveyor system according to claim 1 further comprising a manual input device for permitting manual adjustment of the platform relative to the base.

12. The conveyor system according to claim 11 wherein the manual input device is mounted on the cart.

13. A control system for adjusting a load supported on a conveyor cart platform, the system comprising:
    a driven lift mechanism connected to the conveyor cart platform for adjusting the height of the platform;
    a driven rotational adjustment mechanism supported by the platform for adjusting the rotational orientation of a load supported on the platform; and
    an on-board processor operably connected to each of the mechanisms for actuation and control of the mechanisms by the processor.

14. The control system according to claim 13, further comprising an ID tag reader carried by the conveyor cart for sensing an ID tag associated with each location along a path.

15. The control system according to claim 14, wherein the on-board processor comprises a memory storage device for storage of at least one desired height and at least one desired rotational orientation for each location.

16. The control system according to claim 13, further comprising a system level controller capable of storing data representing desired height and rotational orientation for a plurality of locations, the system further comprising communication means linking the system level controller with the control processor of the conveyor cart for transmission of the stored data.

17. The control system according to claim 16, wherein the communication means comprises a first radio frequency modem connected to the system level controller and a second radio frequency modem carried by the conveyor cart and connected to the control processor.

18. A method of adjusting a load carried by a conveyor cart capable of being directed along a path adjacent at least one location in a facility, the method comprising the steps of:
    providing at least one driven mechanism for adjusting the position the load with respect to the cart;
    providing a sensor capable of determining proximity of the cart to the at least one location;
    providing a control processor connected to the adjustment mechanism for actuating and controlling the mechanism;
    directing the conveyor cart along the path;
    determining where the cart is relative to the at least one location;
    actuating the adjusting mechanism when the cart is at a specific location with respect to the at least one location.

19. The method according the claim 18, wherein the at least one driven mechanism comprises a lift mechanism for adjusting the height of a supported load and a rotational adjustment mechanism for adjusting the rotational orientation of a supported load and wherein the step of actuating provides for simultaneous actuation of both of the mechanisms.

20. The method according to claim 18, further comprising the steps of:
    providing a system level controller capable of storing data representing desired load position for the locations;
    providing a communications means linking the system level controller to the control processor of the conveyor cart;
    notifying the system level controller via the communication link when the sensor determines that the cart is adjacent the at least one location;
    retrieving the desired load position for the sensed location stored by the system level controller; and
    relaying the desired load position for the sensed location to the control processor of the conveyor cart via the communication link.

21. A cart for a conveyor system comprising:
    a platform;
    a base having a plurality of wheels;
    a scissors lift mechanism mounted on the base and the platform, the lift adapted to adjust the height of the platform relative to the base;
    a sensor mounted on the cart for sensing a signal indicative of the location of the cart; and
    a controller mounted to cart, the controller in communication with the sensor for receiving sensed signals indicative of the location of the cart, the controller also in communication with the scissors lift mechanism for controlling actuation of the mechanism, the controller actuating the scissors lift mechanism for adjusting the height of the platform to a prescribed height based on the location of the cart.

22. A cart according to claim 21 further comprising a rotary turntable mounted to the platform, the turntable in communication with the controller; and wherein the controller is adapted to control rotation of the turntable to a prescribed rotational orientation based on the location of the cart.

23. A cart according to claim 22 wherein the controller communicates with an external storage device for retrieving prescribed height and rotational orientation data based on the location of the cart.

24. A cart according to claim 21 wherein the controller communicates with an external storage device for retrieving prescribed height data based on the location of the cart.

25. A cart according to claim 21 wherein the controller is in communication with an onboard storage device for retrieving prescribed height data based on the location of the cart.

26. A cart according to claim 21 further comprising a manual input device mounted to the cart for permitting manual input of height data for varying the height of the platform relative to the base.

* * * * *